United States Patent
Wawro (10) Patent No.: US 10,010,986 B2
(45) Date of Patent: *Jul. 3, 2018

(54) CLAMPING DEVICE

(71) Applicant: Ryszard Wawro, Lindenhurst, NY (US)

(72) Inventor: Ryszard Wawro, Lindenhurst, NY (US)

(73) Assignee: Canine Clamps, Inc., Lindenhurst, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/149,991

(22) Filed: May 9, 2016

(65) Prior Publication Data

US 2016/0250729 A1  Sep. 1, 2016

Related U.S. Application Data

(63) Continuation-in-part of application No. 14/299,708, filed on Jun. 9, 2014, now Pat. No. 9,364,934.

(60) Provisional application No. 61/832,895, filed on Jun. 9, 2013.

(51) Int. Cl.
  *B25B 1/00* (2006.01)
  *B23Q 3/10* (2006.01)
  *B25B 5/10* (2006.01)
  *B23Q 3/06* (2006.01)
  *B25B 1/24* (2006.01)

(52) U.S. Cl.
  CPC .............. *B23Q 3/103* (2013.01); *B23Q 3/06* (2013.01); *B23Q 3/061* (2013.01); *B25B 1/2473* (2013.01); *B25B 5/10* (2013.01); *Y10T 409/309016* (2015.01)

(58) Field of Classification Search
  CPC ............. B23Q 3/103; B23Q 3/06; B23Q 3/05
  See application file for complete search history.

(56) References Cited

U.S. PATENT DOCUMENTS

| | | | |
|---|---|---|---|
| 1,490,063 A | 4/1924 | Tower | |
| 2,882,656 A | 4/1959 | Novkov | |
| 2,969,817 A | 1/1961 | Zabich | |
| 4,108,589 A | 8/1978 | Bunch | |
| 5,735,513 A | 4/1998 | Toffolon | |
| 5,816,568 A | 10/1998 | Fox | |
| 7,044,460 B2 | 5/2006 | Bolton | |
| 8,167,292 B1 | 5/2012 | Mucciacciaro | |
| 8,210,510 B2 | 7/2012 | Li | |
| 8,387,222 B2 | 3/2013 | Chen | |
| 9,364,934 B2 * | 6/2016 | Wawro | B23Q 3/06 |
| 2014/0363252 A1 * | 12/2014 | Wawro | B23Q 3/06 409/225 |

(Continued)

*Primary Examiner* — Lee D Wilson
(74) *Attorney, Agent, or Firm* — The Farrell Law Firm, P.C.

(57) ABSTRACT

An apparatus for clamping a work piece is provided. The apparatus includes a base plate to support the work piece; at least one clamp body fixed to the base plate; at least one fastener fixing the at least one clamp body to the base plate; and a protruding piece having at least a portion thereof inserted into the clamp body and an end thereof extending from a lateral face of the clamp body, the protruding piece including a hollow point tip at the opposite end, where outer and inner lateral surfaces of the hollow point tip join to define a circular sharp edge at the opposite end of the protruding piece.

20 Claims, 11 Drawing Sheets (56) References Cited

U.S. PATENT DOCUMENTS

2016/0250729 A1* 9/2016 Wawro .................... B23Q 3/06
269/91

* cited by examiner

CLAMPING DEVICE

PRIORITY

This application is a Continuation-In-Part (CIP) application of U.S. patent application Ser. No. 14/299,708, which was filed in the U.S. Patent and Trademark Office on Jun. 9, 2014, claims priority under 35 U.S.C. § 119(a) to a United States Provisional application filed in the United States Patent and Trademark Office on Jun. 9, 2013 and assigned Ser. No. 61/832,895, the entire content of each of which is incorporated herein by reference.

BACKGROUND

1. Field of the Invention

The present invention generally relates to an apparatus, and more particularly, to an apparatus for clamping a work piece.

2. Description of the Related Art

When using a milling machine with a clamped work piece, a typical clamp may be limited to being used with only certain types of work piece materials, and is limited in its ability to accurately and firmly holding the work piece in place.

SUMMARY OF THE INVENTION

The present invention has been made to address at least the above problems and/or disadvantages and to provide at least the advantages described below. Accordingly, an aspect of the present invention is to provide an apparatus to prevent relative movement of the work piece during the machining process, which helps to efficiently use the milling power of the machine and to achieve better security and accuracy.

According to an aspect of the present invention, an apparatus for clamping a work piece is provided. The apparatus includes a base plate to support the work piece; at least one clamp body fixed to the base plate; at least one fastener fixing the at least one clamp body to the base plate; and a protruding piece having at least a portion thereof inserted into the clamp body and an end thereof extending from a lateral face of the clamp body, the protruding piece including a hollow point tip at the opposite end, where outer and inner lateral surfaces of the hollow point tip join to define a circular sharp edge at the opposite end of the protruding piece.

According to another aspect of the present invention, an apparatus for clamping a work piece is provided. The apparatus includes a clamp body; at least one fastener fixing the clamp body to a base plate that supports the work piece; and a protruding piece having at least a portion thereof inserted into the clamp body and an end thereof extending from a lateral face of the clamp body at a downward angle, the protruding piece including a hollow point tip at the opposite end, where outer and inner lateral surfaces of the hollow point tip join to define a circular sharp edge at the opposite end of the protruding piece.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. In the description herein, well-known functions and structures which may unnecessarily obscure the subject matter of the present invention may be omitted. The following description includes various specific details to assist in that understanding but these are to be regarded as mere examples. Accordingly, those of ordinary skill in the art will recognize that various changes and modifications of the various embodiments described herein can be made without departing from the scope and spirit of the present invention. Throughout the drawings, like reference numerals may be used to refer to like parts, components, and structures.

Figure 1:
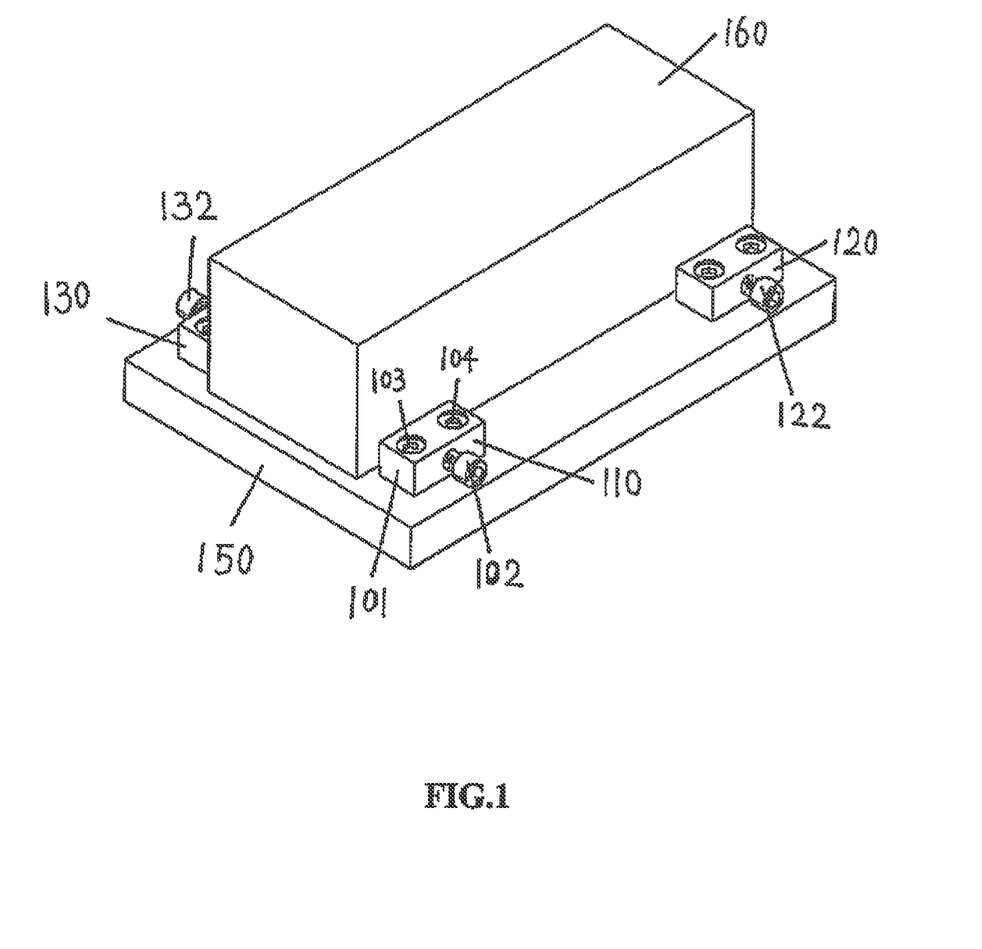
FIG. 1 is a diagram illustrating a perspective view of an apparatus for clamping a work piece according to an embodiment of the present invention.

FIG. 1 is a diagram illustrating a general view of an apparatus for clamping a work piece according to an embodiment of the present invention.

Referring to FIG. 1, an apparatus for clamping a work piece 160 includes four clamping sets of clamp bodies and screws, including sets 110, 120, 130, and a fourth set (not shown). As shown in FIG. 1, two sets 110 and 120 are located near opposite ends of a right side of the work piece 160. Similarly, a third set 130 is located near an end of a left side of the work piece 160, and the fourth set is located near the other end of the left side of the work piece 160 at a location opposite the second set 120. The apparatus further includes a base plate 150.

The base plate 150 is used to support the work piece 160. The four sets of clamp bodies and screws (i.e., first through third sets 110, 120, and 130, and the fourth set) are fixed to the base plate 150 and supported by the base plate 150. In the present embodiment, each set of clamp body and screw is removably attached to the base plate, but fixed sets may also be used in accordance with embodiments of the present invention.

The first set 110 includes a clamp body 101 and a screw 102. The clamp body 101 has two vertical holes to receive corresponding fasteners 103 and 104. The two fasteners 103 and 104 may be screws or other means used to fix the clamp body 101 to the base plate 150. The screw 102 passes through the clamp body 101 through a horizontal hole in the clamp body 101 and reaches the work piece 160. The screw 102 has a hollow point tip made of a hardened material. When clamping, the hollow point tip contacts the work piece and generates a force pressing the hollow point tip against the work piece.

Each of the other sets of clamp bodies and screws, (i.e., sets 120, 130, and the fourth set) has a structure and configuration similar to that of set 110. When the screw 102 of the first set 110 and the strew 132 of the third set 130 are driven together towards the work piece 160, the hollow point tips of the two opposite screws 102 and 132 clamp the work piece 160 and generate a force that holds the work piece 160 at one end of the work piece 160. Similarly, when the screw 122 of the second set 120 and the screw of the fourth set (not shown) are driven to towards the work body 160, the hollow point tips of the two opposite screws clamp the work piece 160 and generate a force that holds the work piece 160 at the opposite end of the work piece 160.

Although four sets of clamp bodies and screws are illustrated in FIG. 1, the apparatus for clamping the work piece may contain one or more sets of clamp bodies and screws. The arrangement of the sets of clamp bodies and screws are not limited to the configuration illustrated in FIG. 1, including placing the sets at any location where a screw of the may apply pressure to secure a work piece.

Although two fasteners inserted through two holes in the clamp body are described here as means for fixing the clamp body to the base plate, the means for fixing the clamp body to the base plate is not limited thereto, and any quantity or type of fastener may be used in accordance with embodiments of the present invention.

As shown in FIG. 1, fasteners 103 and 104 have diameters corresponding to the diameter of the holes in the clamp body 101, such that, when the fasteners 103 and 104 are inserted in the clamp body, the clamp body is not movable with respect to the base 150.

Although two vertical holes and one horizontal hole (e.g., with respect to set 101, holes 103 and 104 and the hole for receiving screw 102) are shown and described with respect to each clamp body of FIG. 1, the direction of each hole and the arrangement of the holes are not limited thereto.

Figure 2:
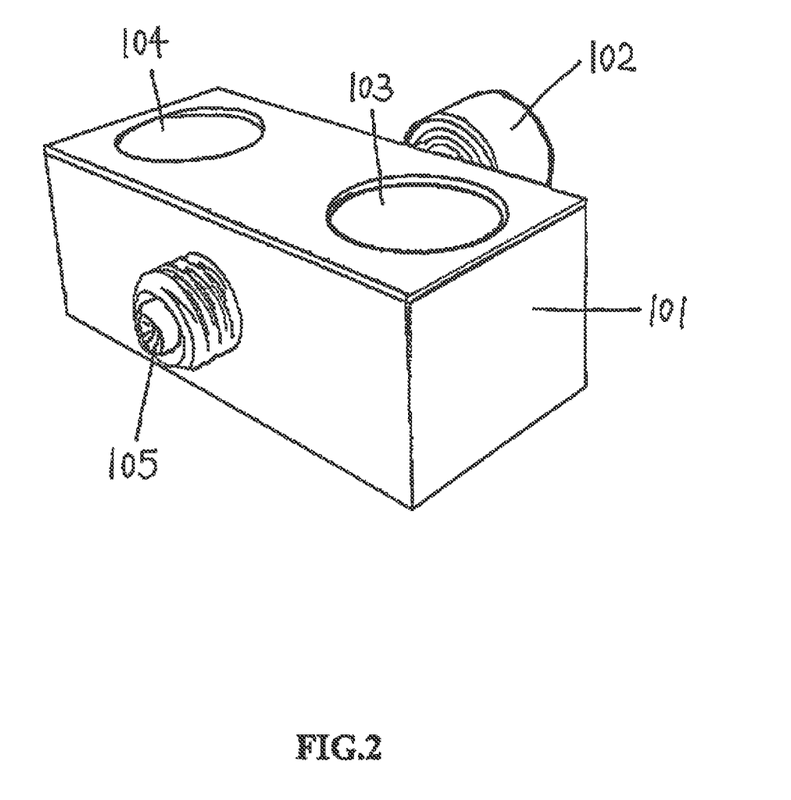
FIG. 2 is a diagram illustrating an angled side view of a clamp body having a hole that receives a corresponding screw with a hollow point tip according to an embodiment of the present invention.

FIG. 2 is a diagram illustrating an angled side view of a clamp body having a hole that receives a corresponding screw with a hollow point tip according to an embodiment of the present invention.

Referring to FIG. 2, the screw 102 passing through the clamp body 101 has a hollow point tip 105. The hollow point tip 105 may be integrally formed as a part of the screw 102, that is, the screw 102 has an end in a same shape as that of a hollow point bullet. Alternatively, the hollow point tip 106 may be formed as a separate piece from a body of the screw and inserted into a hollowed end of the screw, as described in further detail herein with reference to FIGS. 3A and 3B.

Figure 3A:
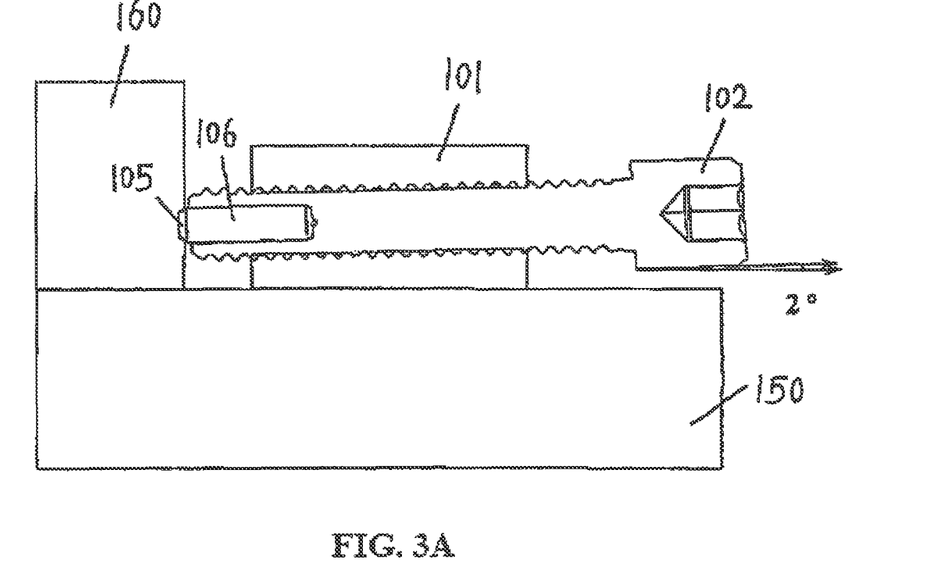
FIG. 3A is a diagram illustrating a cross-sectional view of an apparatus for clamping a work piece according to an embodiment of the present invention.
Figure 3B:
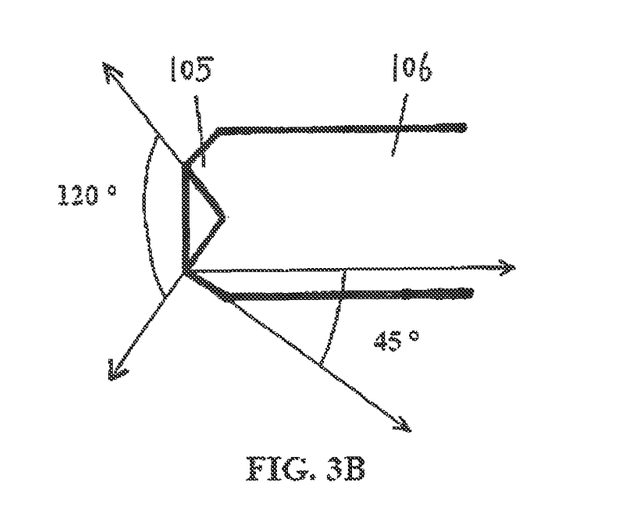
FIG. 3B is a diagram illustrating a cross-sectional view of a hollow point tip of a plunging piece according to an embodiment of the present invention.

FIG. 3A is a diagram illustrating a cross-sectional view of an apparatus for clamping a work piece according to an embodiment of the present invention. FIG. 3B is a diagram illustrating a cross-sectional view of a hollow point tip of a plunging piece according to an embodiment of the present invention.

Referring to FIGS. 3A and 3B, the screw 102 passing through the clamp body 101 has a hollowed end, and one end of a plunging piece 106 is inserted into the hollowed end of the screw 102. The other end of the plunging piece 106 is a hollow point tip 105, which is pressed into the work piece 160 to clamp the work piece 160.

The hollow point tip 105 has outer lateral surface and inner lateral surface. The outer lateral surface and inner lateral surface join together at a circular sharp edge. In the present example, the outer lateral surface is defined by a lateral surface of a frustum of a right circular cone. In the present example, the outer lateral surface forms a 45 degree angle with respect to the moving direction of the screw. As another example, the inner lateral surface forms a hollow in a shape of a right circular cone and is defined by a lateral surface of the right circular cone. In the present example, the inner lateral surface forms a hollow in a shape of a right circular cone with a 120 degree aperture. Although defined as above, the shapes of the outer and inner lateral surfaces, as well as the angles formed by the outer and inner later surfaces are not limited to the above examples, and other shapes and angles may be used in accordance with embodiments of the present invention.

In the present example, the screw 102 moves horizontally toward the work piece 160 through the hole in the clamp body at a downward angle. That is, the moving direction of the screw 102 is angled slightly downward with respect to the horizontal plane provided by the base plate, such as at a downward angle of 2 degrees. However, other angles may be used in accordance with embodiments of the present invention.

The plunging piece is made of a hardened material. For optimal clamping, the hardened material is hardened to 60 Rockwell C (RC) scale. Use of a separate plunging piece inserted in the screw allows the plunging piece to be formed of a greater variety of materials and hardness than that used in forming the body of the screw.

In the present example, the main body of the plunging piece is in a shape of a right circular cylinder, but other shapes may be used in accordance with embodiments of the present invention.

Figure 4:
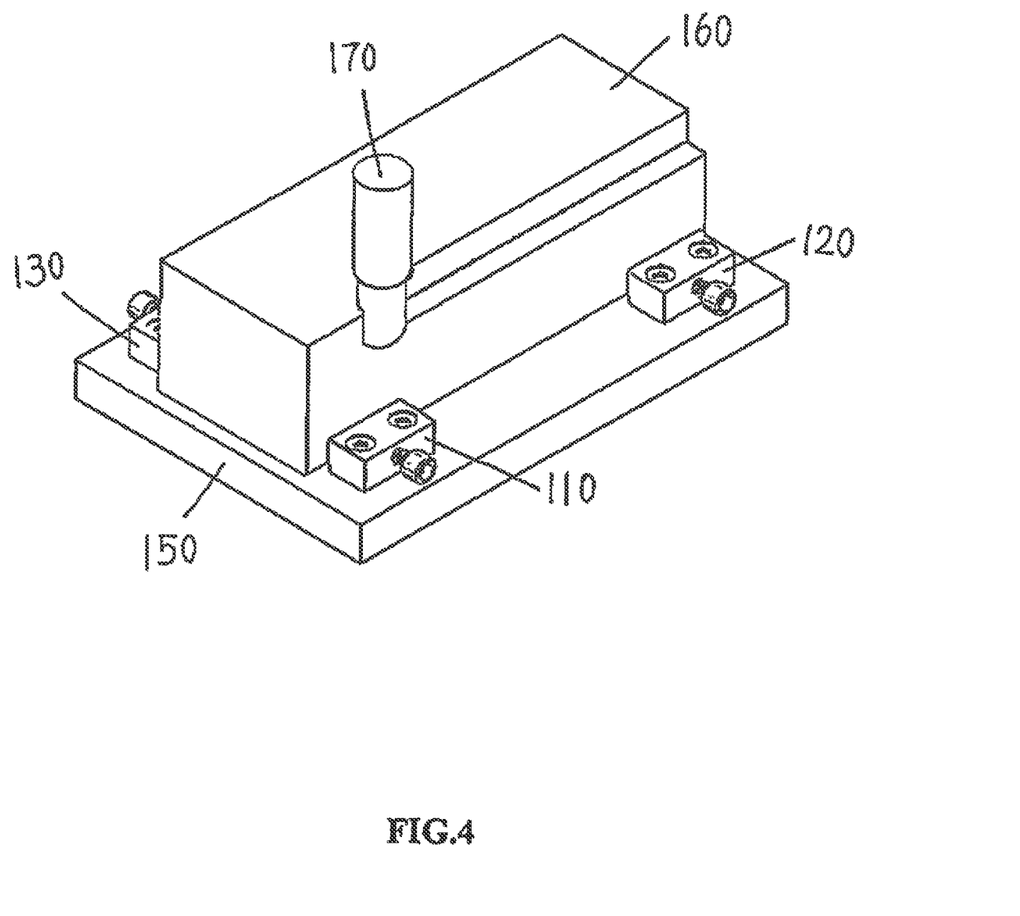
FIG. 4 is a diagram illustrating a general view of operating an apparatus for clamping a work piece according to an embodiment of the present invention.

FIG. 4 is a diagram illustrating a general view of operating an apparatus for clamping a work piece according to an embodiment of the present invention.

Referring to FIG. 4, when the apparatus for clamping a work piece is used, the four sets of the clamp bodies and screws (i.e., first through third sets 110, 120, and 130, and the fourth set (not shown)) function together to clamp down the work piece 170. The end mill 170 of a milling machine (e.g., a Numerical Control (NC) milling machine) operates on the work piece 160 for NC milling machining. This apparatus provides an efficient, convenient, safe and inexpensive way to strongly clamp down any work material to the base plate for NC milling machining.

As illustrated below, examples of parameters of an apparatus for clamping a work piece according to an embodiment of the present invention are provided. Referring to TABLE 1, three sizes of screws that may be used in apparatus for clamping a work piece in accordance with embodiments of the present invention are listed with the corresponding gripping force and travel range.

TABLE 1

| SCREW size (inches) | GRIPPING force (@1700 lb-in) | TRAVEL range (inches) |
|---|---|---|
| ½-13 | 8 ton | ½" |
| ⅝-11 | 12 ton | ⅝" |
| ¾-10 | 17 ton | ⅝" |

Figure 5:
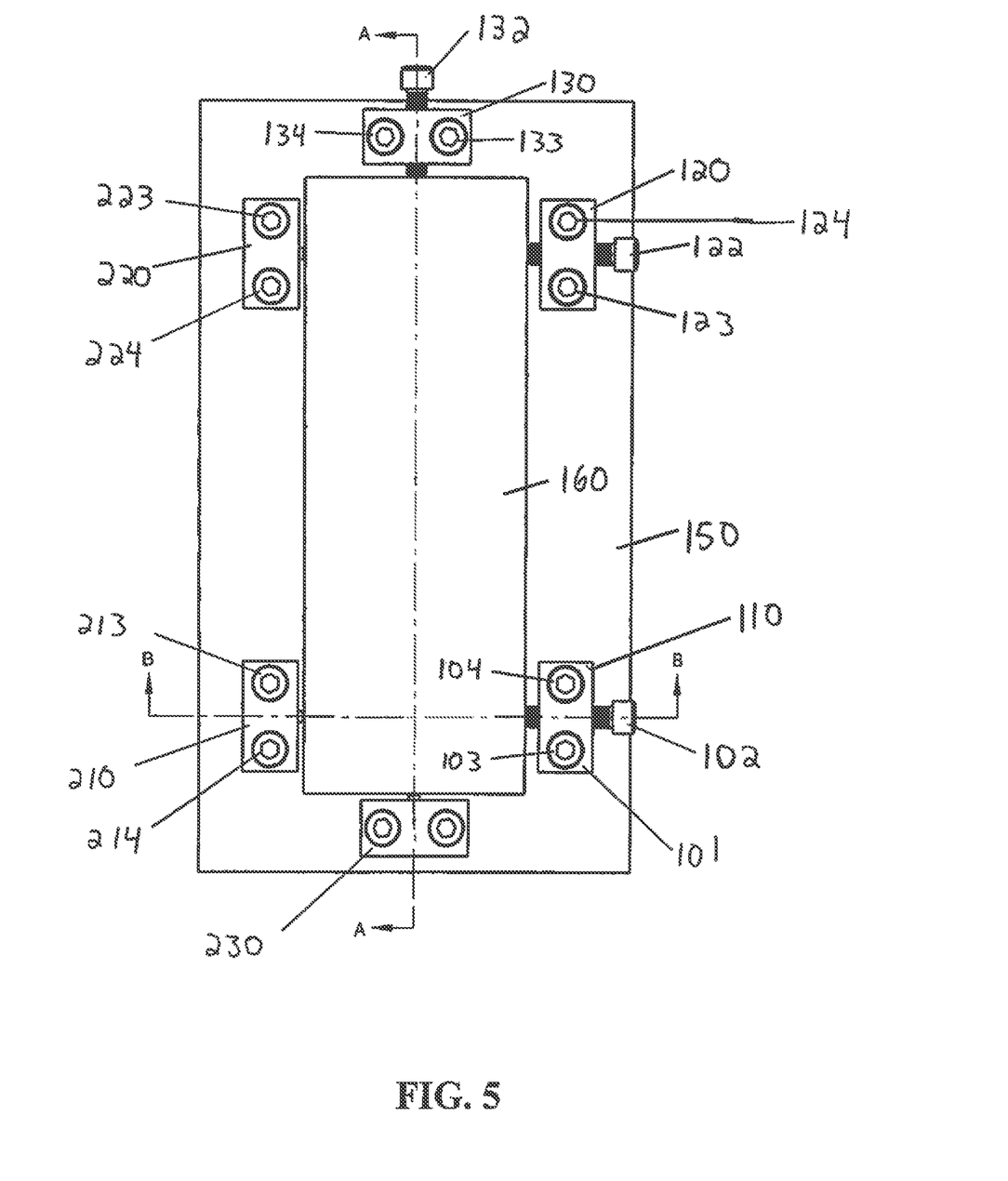
FIG. 5 is a diagram illustrating a top view of an apparatus for clamping a work piece according to another embodiment of the present invention.
Figure 6:
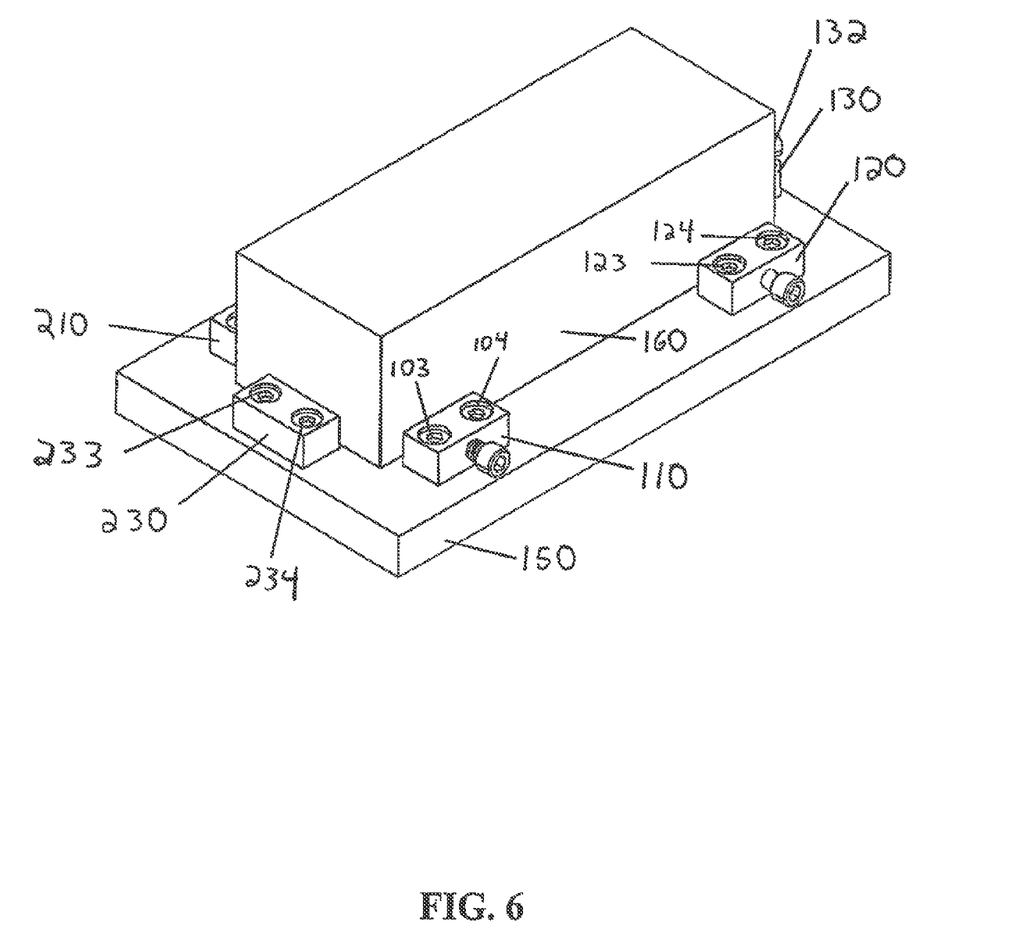
FIG. 6 is a diagram illustrating a perspective view of the apparatus of FIG. 5.
Figure 7:
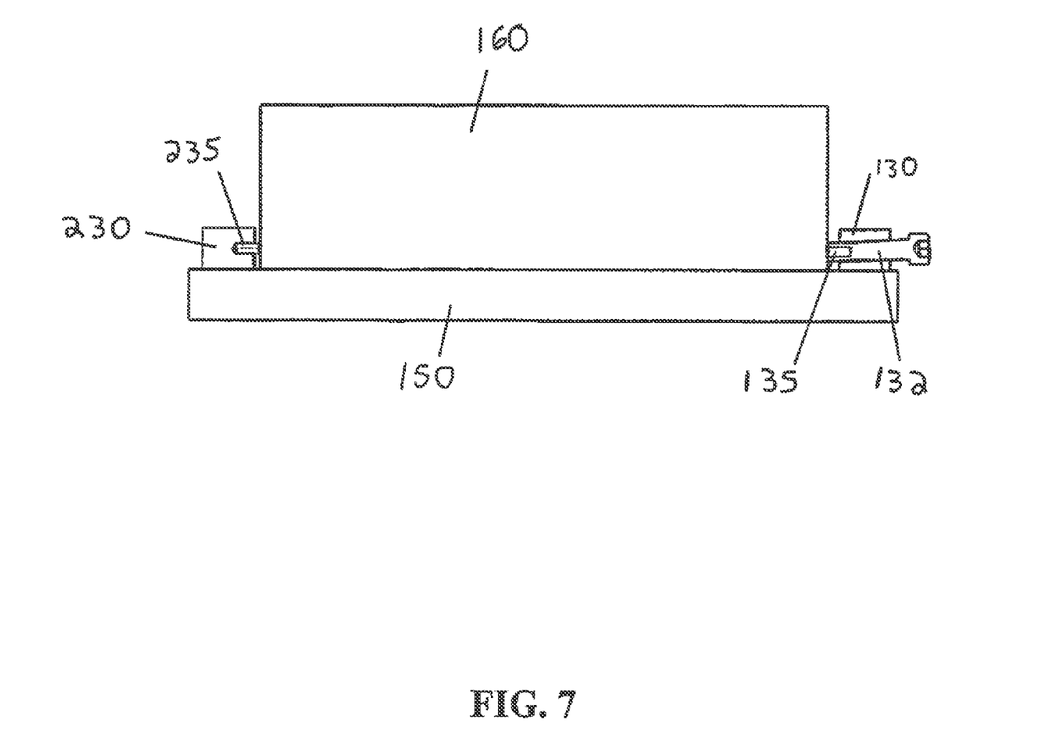
FIG. 7 is a side section view of the apparatus of FIG. 5 taken along line A-A of FIG. 5.
Figure 8:
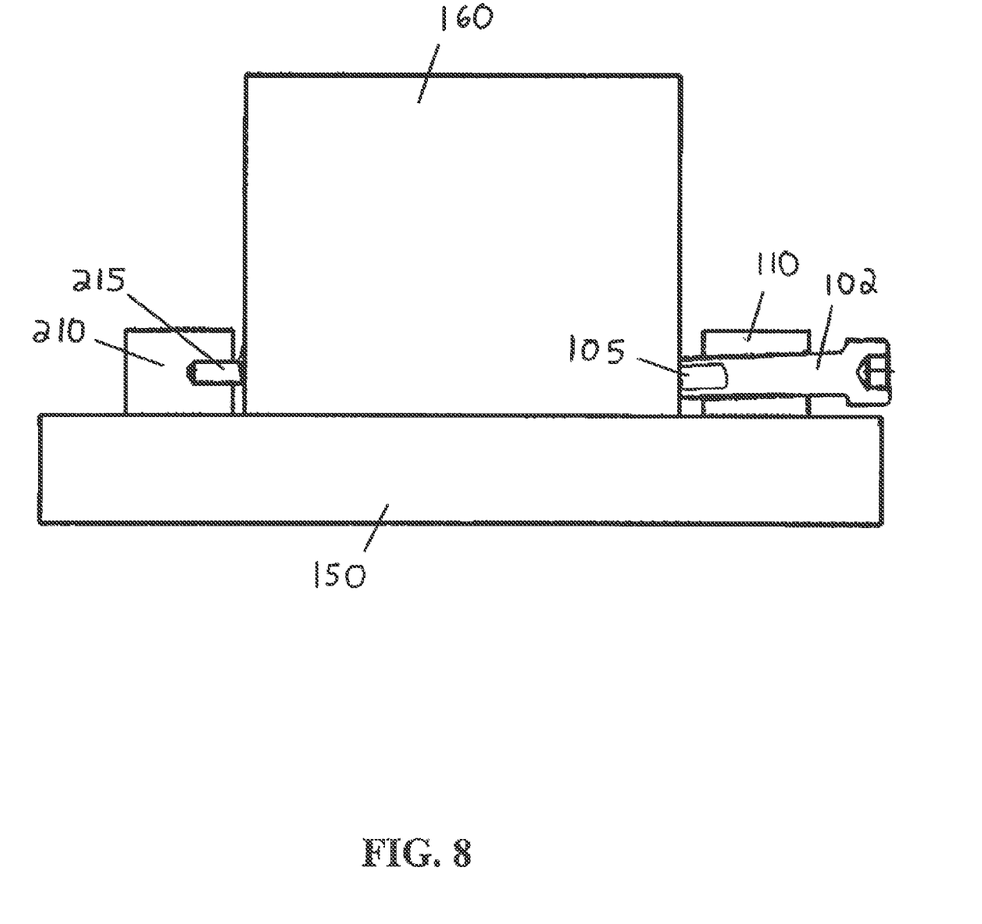
FIG. 8 is a front section view of the apparatus of FIG. 5; taken along line B-B of FIG. 5.

FIG. 5 is a diagram illustrating a top view of an apparatus for clamping a work piece according to another embodiment of the present invention. FIG. 6 is a diagram illustrating a perspective view of the apparatus of FIG. 5. FIG. 7 is a side section view of the apparatus of FIG. 5. FIG. 8 is a front section view of the apparatus of FIG. 5.

Referring to FIGS. 5-8, according to another embodiment of the present invention, instead of using four clamping sets of clamp bodies and screws (i.e., clamp sets 110, 120, 130, and a fourth set not shown in FIGS. 1-4), the embodiment according to FIGS. 5-9 uses one pair of clamping sets of clamp bodies and screws 110 and 120 at a right side of the work piece 160, one pair of fixed clamp bodies 210 and 220 at a right side of the work piece 160, a third clamping set of a clamp body and a screw 130 at a rear of the work piece 16.0, and a third fixed clamp body 230 located at a front of the work piece 160.

Clamp bodies 110, 120, and 130 are secured to the base 150 by pairs of screws 103 and 104, 123 and 124, and 133 and 134 respectively.

Fixed clamp body 210 is secured to the base 150 by screws 213 and 214, while a hollow point tip 215 extends from the clamp body 210 towards the work piece 160 in order to secure the work piece. Similarly, fixed clamp body 220 is secured to the base 150 by screws 223 and 224, while a hollow point tip 225 extends from the clamp body 220 towards the work piece 160 in order to secure the work piece. Fixed clamp body 230 is secured to the base 150 by screws 233 and 234, while a hollow point tip 235 extends from the clamp body 230 towards the work piece 160 in order to secure the work piece.

The hollow point tips 215, 225, and 235 may be constructed in the same manner as the hollow point tips (e.g., hollow point tip 105) according to the previously-described embodiment of the present invention, but inserted directly into the fixed clamp bodies 210, 220, and 230 instead of inserted into a corresponding screw.

Although clamp bodies 110, 120, and 130 and fixed clamp bodies 210, 220, and 230 are depicted as being secured to the base 150 by screws, other devices or materials may be used to secure the clamps and clamp bodies to the base 150 in accordance with embodiments of the present invention.

Although in FIGS. 5-8, the hollow point tips 215, 225, and 235 are separate pieces inserted in to a side of respective fixed clamp bodies 210, 220, and 230, the hollow point tips 215, 225, and 235 may be integrally formed with the fixed clamp bodies 210, 220, and 230 in accordance with embodiments of the present invention.

Figure 9:
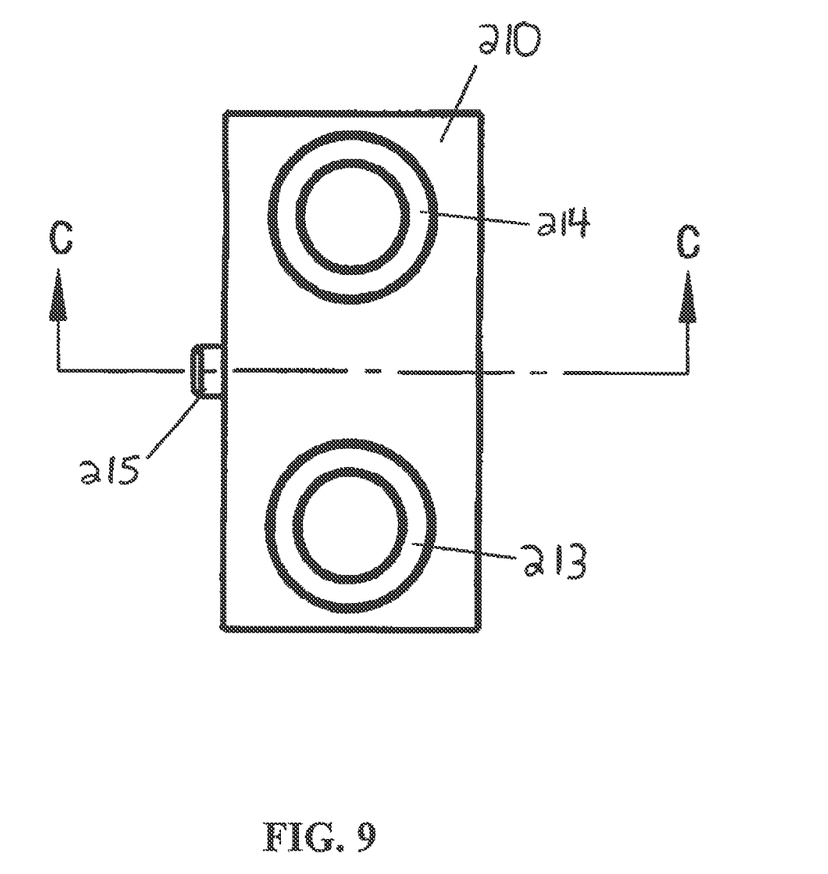
FIG. 9 is a diagram illustrating a top view of a fixed clamp body having a hole that receives a hollow point tip according to the apparatus of FIG. 5.
Figure 10:
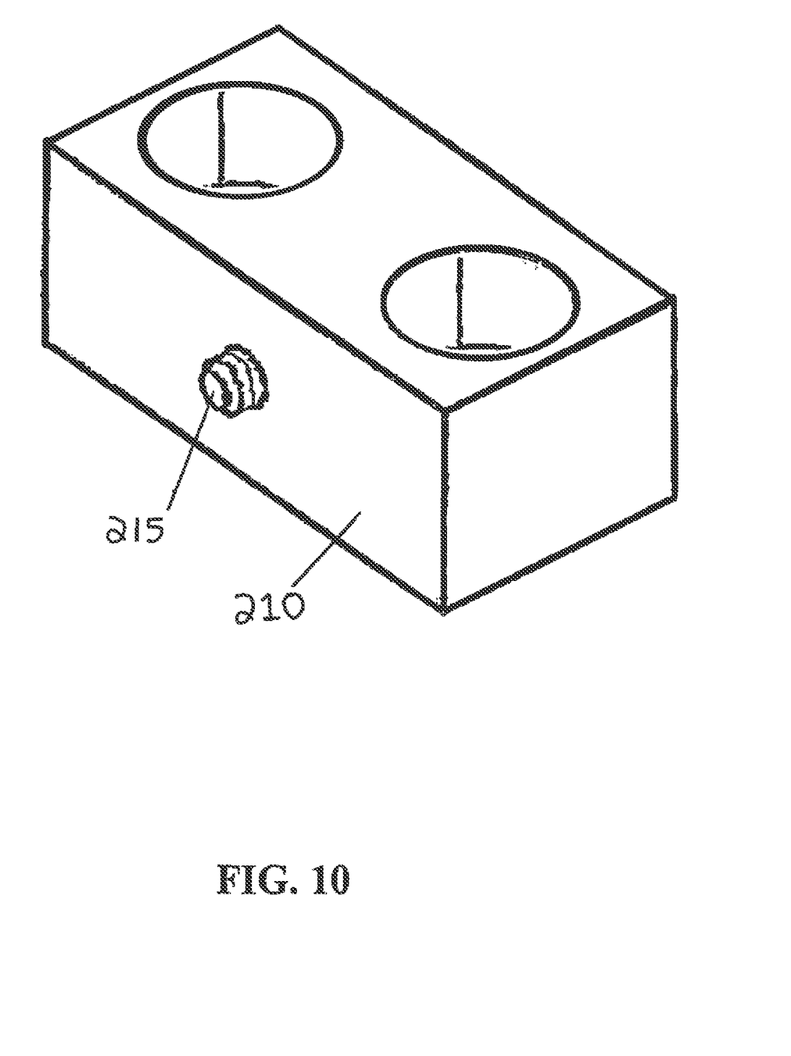
FIG. 10 is a diagram illustrating a perspective view of the fixed clamp body of FIG. 9.
Figure 11:
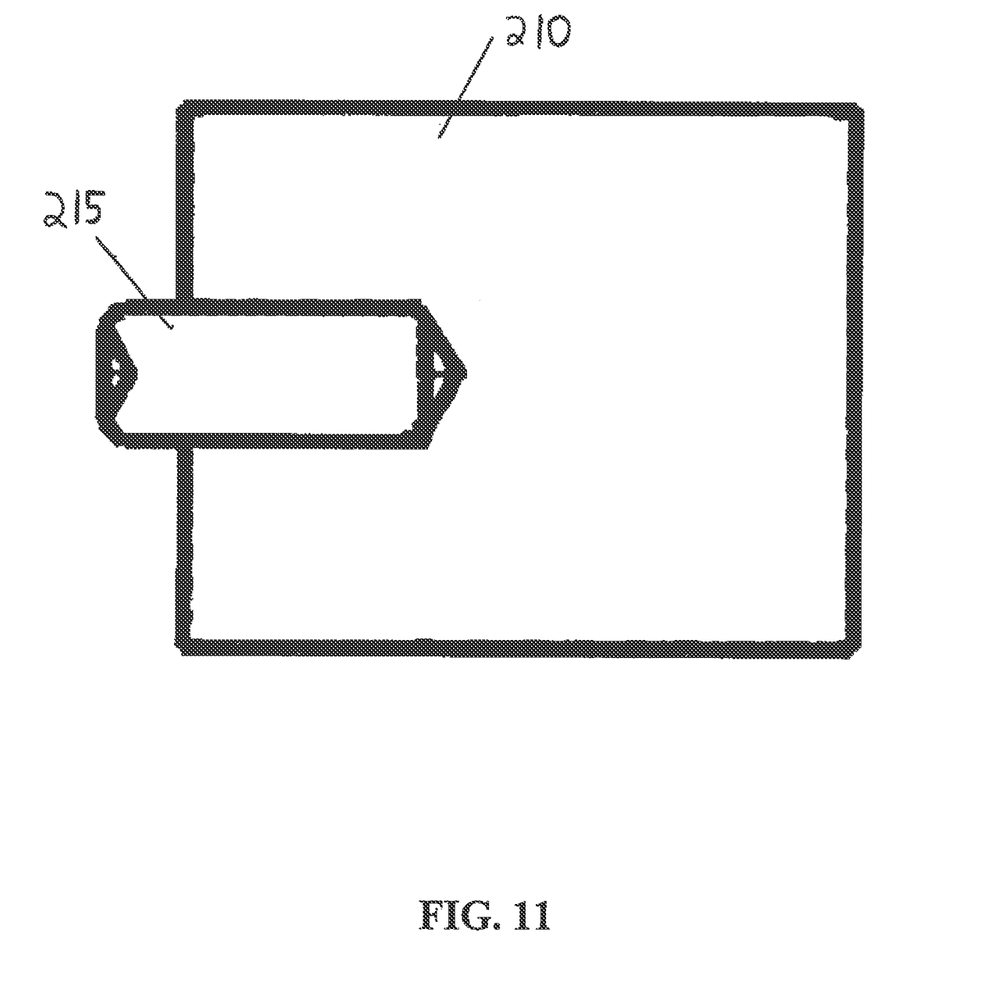
FIG. 11 is a diagram illustrating a front section of the fixed clamp body of FIG. 9 taken along line C-D of FIG. 9.

FIG. 9 is a diagram illustrating a top view of a fixed clamp body having a hole that receives a hollow point tip according to the apparatus of FIG. 5. FIG. 10 is a diagram illustrating a perspective view of the fixed clamp body of FIG. 9. FIG. 11 is a diagram illustrating a front section of the fixed clamp body of FIG. 9.

Referring to FIGS. 9-11, in contrast to the clamp body 101 of FIG. 2, the fixed clamp body 201 of FIGS. 9-11 does not receive a screw including a plunging piece with a hollow point tip. Instead, a plunging piece 206 with a hollow point tip 205 is inserted directly into a side of the clamp body 201. As shown in FIGS. 8 and 11, the plunging piece 206 may be inserted into the clamp such that the circular edge of the hollow point tip is parallel to a side of the work body 160. However, according to alternative embodiments of the present invention, the plunging piece may protrude at different angles, such as the slightly downward angle of the hollow point tip 106 illustrated in FIGS. 3A and 3B.

Further, although FIGS. 1 and 6, for example, illustrate two examples of arrangements of clamp bodies that receive a movable screw, and fixed clamp bodies that directly receive a plunging piece, other arrangements and combinations of clamp bodies with movable screws and fixed clamp bodies that directly receive a plunging piece may be used in accordance with embodiments of the present invention.

For example, any or all of the fixed clamp bodies 210, 220, and 230 of FIG. 5 may be replaced with clamp sets including movable screws, such as clamp sets 110, 120, and 130. Similarly, any or all of the clamp sets 110, 120, and 130 may be replaced with fixed clamp bodies, such as clamp bodies 210, 220, and 230. Further, the total number of clamp sets and clamp bodies securing a work piece may vary. For example, in contrast to the example illustrated in FIG. 5, a clamp set or a clamp body may be located at only one of the front and the rear of the work piece 160. Alternatively, there may be no clamp sets or fixed clamp bodies at the front and rear of the work piece 160. Any combination of any number of fixed clamp bodies or clamp sets with movable screws may be located along any side of a work piece in accordance with embodiments of the present invention.

An apparatus according to embodiments of the present invention prevents relative movement of the work piece during the machining process, which helps to efficiently use the milling power of the machine and to achieve better security and accuracy.

An apparatus according to embodiments of the present invention can be used with any NC machinable material (e.g., aluminum, steel, titanium), forged or not, and not necessarily previously milled, thereby reducing preparation costs.

An apparatus according to embodiments of the present invention provides a stronger clamping force than that of other options currently available on the market.

An apparatus according to embodiments of the present invention provides a greater travel range than that of other options currently available on the market, allowing for machining to be done on forged work blocks, if necessary, and on work blocks that are not previously milled.

An apparatus according to embodiments of the present invention allows for greater tolerances (e.g., size, shape, and parallelism) in the material being clamped, while still accurately and firmly holding the material in place. For example, an apparatus according to an embodiment of the present invention can be used with a work block that is not perfectly shaped or perfectly paralleled, while still achieving a strong grip.

While the present invention has been particularly shown and described with reference to certain embodiments thereof, various changes in form and detail may be made therein without departing from the spirit and scope of the present invention as defined by the following claims. Accordingly, the scope of the present invention will be defined by the appended claims and equivalents thereto.

What is claimed is:

1. An apparatus for clamping a work piece, the apparatus comprising:
   a base plate to support the work piece;

at least one clamp body fixed to the base plate;

at least one fastener fixing the at least one clamp body to the base plate; and a protruding piece having at least a portion thereof inserted into the clamp body and an end thereof extending from a lateral face of the clamp body, the protruding piece including a hollow point tip at the opposite end, where outer and inner lateral surfaces of the hollow point tip join to define a circular sharp edge at the opposite end of the protruding piece.

2. The apparatus of claim 1, wherein, for each of at least one of the at least one clamp body, the protruding piece comprises a screw received by a hole passing through the clamp body such that the as the screw is inserted through the clamp body, an end of a body of the screw moves horizontally towards the work piece supported by the base plate at a downward angle.

3. The apparatus of claim 1, wherein the at least one clamp body comprises:

two clamp bodies arranged at a left side of the work piece supported by the base plate; and two clamp bodies arranged at a right side of the work piece opposite the two clamp bodies at the left side.

4. The apparatus of claim 3, wherein the at least one clamp body further comprises:

at least one clamp body arranged at a front side of the work piece supported by the base plate; and at least one clamp body arranged at a rear side of the work piece opposite the clamp body at the front side.

5. The apparatus of claim 1, wherein at least one the clamp body is removably attached to the base plate.

6. The apparatus of claim 1, wherein for each of at least one of the at least one clamp body, the circular sharp edge of the protruding piece is parallel to the lateral face of the clamp body.

7. An apparatus for clamping a work piece, the apparatus comprising:

a clamp body;

at least one fastener fixing the clamp body to a base plate that supports the work piece; and a protruding piece having at least a portion thereof inserted into the clamp body and an end thereof extending from a lateral face of the clamp body at a downward angle, the protruding piece including a hollow point tip at the opposite end, where outer and inner lateral surfaces of the hollow point tip join to define a circular sharp edge at the opposite end of the protruding piece.

8. The apparatus of claim 7, wherein the circular sharp edge of the protruding piece is parallel to the lateral face of the clamp body.

9. The apparatus of claim 7, wherein the protruding piece comprises:

a screw having a hollowed end at a body of the screw, the screw being received by a hole passing through the clamp body such that the as the screw is inserted through the clamp body, an end of a body of the screw moves horizontally towards the work piece supported by the base plate at a downward angle; and a plunging piece having one end inserted into the hollowed end of the screw and the hollow point tip at an opposite end of the plunging piece.

10. The apparatus of claim 9, wherein a main body of the plunging piece is in a shape of a right circular cylinder.

11. The apparatus of claim 9, wherein the plunging piece is made of a hardened material.

12. The apparatus of claim 9, wherein the downward angle is 2 degrees.

13. The apparatus of claim 7, wherein the outer lateral surface of the hollow point tip is defined by a lateral surface of a frustum of a right circular cone.

14. The apparatus of claim 13, wherein the outer lateral surface of the hollow point tip forms a 45 degree angle with respect to a central axis of the screw.

15. The apparatus of claim 7, wherein the inner lateral surface of the hollow point tip forms a hollow in a shape of a right circular cone and is defined by a lateral surface of the right circular cone.

16. The apparatus of claim 15, the inner lateral surface of the hollow point tip forms the hollow in the shape of the right circular cone with a 120 degree aperture.

17. The apparatus of claim 15, wherein the hardened material is hardened to 60 Rockwell C (RC) scale.

18. The apparatus of claim 7, wherein the at least one fastener fixing the clamp body to the base plate comprises two fasteners inserted through a second hole and a third hole in the clamp body, wherein lateral surfaces of the fasteners have a circumference corresponding to a circumference of the second hole and third hole.

19. The apparatus of claim 18, wherein the second hole and the third hole are approximately perpendicular to the first hole.

20. The apparatus of claim 19, wherein the fasteners are screws.

* * * * *